United States Patent
Muller et al.

(10) Patent No.: US 7,627,389 B2
(45) Date of Patent: Dec. 1, 2009

(54) METHOD AND APPARATUS FOR THE FREE-FORM OPTIMIZATION OF BEVEL AND HYPOID GEARS

(75) Inventors: Hartmuth Muller, Remscheid (DE); Olaf Vogel, Etllingen (DE); Roland Dutschk, Dresden (DE); Carsten Hunecke, Huckeswagen (DE)

(73) Assignee: Klingelnberg GmbH, Hueckeswagen (DE)

( * ) Notice: Subject to any disclaimer, the term of this patent is extended or adjusted under 35 U.S.C. 154(b) by 304 days.

(21) Appl. No.: 11/451,637

(22) Filed: Jun. 13, 2006

(65) Prior Publication Data

US 2006/0285936 A1      Dec. 21, 2006

Related U.S. Application Data

(60) Provisional application No. 60/705,602, filed on Aug. 3, 2005.

(30) Foreign Application Priority Data

Jun. 16, 2005     (WO) ................ PCT/EP2005/006485
Jun. 17, 2005     (WO) ................ PCT/EP2005/006542

(51) Int. Cl.
*G05B 19/404*     (2006.01)
*G05B 17/02*     (2006.01)
*G06F 19/00*     (2006.01)

(52) U.S. Cl. .................. 700/97; 703/2; 703/7; 706/12; 706/21; 451/1; 451/47

(58) Field of Classification Search .................. 700/97; 703/7, 2; 706/12, 21; 451/1, 47
See application file for complete search history.

(56) References Cited

U.S. PATENT DOCUMENTS 4,981,402 A     1/1991     Krenzer et al. ................ 409/26

(Continued)

FOREIGN PATENT DOCUMENTS

EP     0 784 525 B1     5/2002

OTHER PUBLICATIONS

Wiener, D. "Localised Flank Corrections for Optimumisation of Spiral Tooth Bevel Gears", Dr.-Ing. Dieter Wiener, pp. 1-14.

(Continued)

*Primary Examiner*—Michael D Masinick
(74) *Attorney, Agent, or Firm*—McCormick, Paulding & Huber LLP (57) ABSTRACT

Method for the optimization of the surface geometry or of a variable, dependent on this, or variables, dependent on this, of bevel or hypoid gears for their production on a free-form machine which can be mapped to a free-form basic machine with at most six axes uniquely in a reversible way, even to symmetries, which has a gearwheel to be machined and a tool which are in each case rotatable about an axis, and the tool and the gearwheel to be machined are moveable, preferably displaceable or rotatable, with respect to one another along or about a plurality of axes, the optimization of the surface geometry or of the variable or variables, dependent on this, of the bevel or hypoid gearwheel taking place in that one or more control parameters, which has or have influence on the surface geometry or the variable or variables, dependent on this, of the bevel or hypoid gearwheel, is or are varied by means of a simulation of the gearwheel production process and/or a roll and/or a load-contact analysis on the free-form basic machine, until the surface geometry or the variable or variables, dependent on this, of the bevel or hypoid gearwheel thereby corresponds at least to a predetermined target value.

34 Claims, 5 Drawing Sheets

U.S. PATENT DOCUMENTS

| | | | | | |
|---|---|---|---|---|---|
| 5,381,704 | A | * | 1/1995 | Knotts | 74/416 |
| 5,580,298 | A | * | 12/1996 | Stadtfeld | 451/1 |
| 6,050,883 | A | * | 4/2000 | Wiener | 451/47 |
| 6,390,893 | B1 | * | 5/2002 | Stadtfeld et al. | 451/47 |
| 7,364,391 | B1 | * | 4/2008 | Stadtfeld et al. | 409/2 |
| 2005/0159938 | A1 | * | 7/2005 | Shigemi et al. | 703/7 |

OTHER PUBLICATIONS

Stadtfeld, H.J. "The Universal Motion Concept for Bevel Gear Production", The Gleason Works, Rochester, NY, pp. 595-606.

Vogel, O.; Griewank, A.; Henlich, T.; and Schlecht, T. "Automatic Differentiation in Mechanical Engineering—Simulation and Optimization of Spiral Bevel-Gear Drives" (German full text and English summary).

Bronstein, I.N.; Semendjajew, K.A.; Musiol, G. and Muhlig, G. Handbook of Mathematics, $4^{th}$ Ed. pp. 947-948 and 955-960.

Hemmelmann. "Bevel Gear Geometry".

Goldrich, R. "CNC Generation of Spiral Bevel and Hypoid Gears: Theory and Practice", The Gleason Works, Rochester, NY 1990, pp. 1-9.

Krenzer, T. "CNC Bevel Gear Generators and Flared Cup Formate Gear Grinding", The Gleason Works, Rochester, NY, 1991.

Nocedal, J and Wright, S. "Numerical Optimumization, Springer Series in Operations Research", NY, 1999, pp. 1-623.

Wiener, D. "Localised Flank Corrections for Optimumisation of Spiral Tooth Bevel Gears", Dr.-Ing. Dieter Wiener, pp. 1-14, 1980.

Stadtfeld, H.J. "The Universal Motion Concept for Bevel Gear Production", The Gleason Works, Rochester, NY, pp. 595-606, 1999.

Simon, V "Optimal Machine Tool Setting for Hypoid Gears Improving Load Distribution", V. Simon, Journal of Mechanical Design, vol. 123, Dec. 2001, pp. 577-582.

Gosselin, C; Guertin, T; Remond, D; Jean, Y "Simulation and Experimental Measurement of the Transmission Error of Real Hypoid Gears Under Load", Journal of Mechanical Design, vol. 122, Mar. 2000, pp. 109-122.

Gosselin, C; Masseth, J; Noga, S "Stock Distribution Optimization in Fixed Setting Hypoid Pinions", Gear Technology, Jul./Aug. 2001, pp. 34-39.

Vogel, O.; Griewank, A.; Henlich, T.; and Schlecht, T. "Automatic Differentiation in Mechanical Engineering—Simulation and Optimization of Spiral Bevel-Gear Drives" (German full text and English summary), 2003.

Muller, H; Wiener, D. and Dutschk, R. "A Modular Approach Computing Spiral Bevel Gears and Curvic Couplings", Proceedings of the $4^{th}$ World Congress on Gearing and Power Transmission, Band 1, Paris 1999, pp. 531-540.

Bronstein, I.N.; Semendjajew, K.A.; Musiol, G. and Muhlig, G. Handbook of Mathematics, $4^{th}$ Ed. pp. 947-948 and 955-960, Jun. 2004.

Golub, G. and Ortega, J.M. "Scientific Computing, An Introduction with Parallel Computing", Stuttgart 1996.

Griewank, A. Evaluating Derivatives. Principles and Techniques of Algorithmic Differentiation, Philadelphia, SIAM, 2000.

Vogel, O. "Accurate Gear Tooth Contact and Sensitivity Computation for Hypoid Bevel Gears", in: Corliss, G.; Faure, C.; Griewank, A.; Hascoet, L. and Naumann, U. "Automatic Differentiation of Algorithms—From Simulation to Ptimization", New York, 2002.

Koza, J., "Genetic Programming", MIT, USA 1992, pp. 73-77.

Hemmelmann. "Bevel Gear Geometry", Mar. 2000.

Hutschenreiter, U. "A New Method for Bevel Gear Tooth Flank Computation" in "Computation Differntiation—Techniques, Application, and Tools" Philadelphia, SIAM 1996, pp. 329-341.

Vogel, O; Griewank, A and Bar, G. Direct Gear Toot Contact Analysis for Hypoid Bevel Gears, in Computer Methods in Applied Mechanics and Engineering 191 (2002), pp. 3965-3982.

"American National Standard—Design Manual for Bevel Gears"—ANSI/AGMA 2005-C96, ANSI-AGMA 2005-D03

"Klingelnberg Cyclo-Palloid System", KN 3029 Ed. 5.

Judd, K. "Numerical Methods in Economics", MIT 1998.

* cited by examiner

METHOD AND APPARATUS FOR THE FREE-FORM OPTIMIZATION OF BEVEL AND HYPOID GEARS

CROSS-REFERENCE TO RELATED APPLICATIONS

This application is a Non-Provisional Application claiming priority to Provisional Application Ser. No. 60/705,602 filed on Aug. 3, 2005; PCT Application No. PCT/EP2005/006485, filed Jun. 16, 2005; and PCT Application No. PCT/EP2005/006542, filed Jun. 17, 2005, which are incorporated herein by reference.

BACKGROUND OF THE INVENTION

The present invention relates to a method and a apparatus for the free-form optimization of bevel and hypoid gears, to methods and apparatus for the production of thus optimized gears and to a method and a apparatus for the correction of already produced bevel and hypoid gears by means of free-form optimization.

In the manufacture of gears, in particular the manufacture of bevel and hypoid gears, the running properties and the stressing of such gears, such as, for example, their quiet running, nowadays have to satisfy ever higher requirements. These properties can no longer be achieved by means of gears, such as can be manufactured, for example, on machines of an older type of construction, since these machines do not afford sufficient possibilities for influencing the surface geometry of the gears in the light of modern increased requirements regarding running properties and stress.

To be precise, in these machines of an older type of construction, referred to below as non-free-form machines, in order to influence the gearwheel geometry, in particular the tooth geometry, there is in the first place only a selection of what are known as basic machine settings available which each have a theoretical significance for the gearwheel to be produced. These basic machine settings in this case relate to what is known as a basic machine which constitutes a mathematically theoretical model in relation to which all conceivable real non-free-form machines can be uniquely mapped in a reversible way, the real non-free-form machines mostly having fewer axes than the basic machine (also referred to as a basic tooth-cutting machine), but even then, not all types of toothings can be manufactured.

An illustration of this basic machine and its basic machine settings is found, for example, in Goldrich (Goldrich, "*CNC Generation of Spiral Bevel and Hypoid Gears: Theory and Practice*", The Gleason Works, Rochester, N.Y. 1990), although the significance of these is also discussed in EP 0 784 525. Admittedly, the non-free-form machines of an older type of construction, which are based on such a basic machine, have been modified, in the course of technical development, such that, in addition to the fixed axis settings mentioned, they also allowed certain (additional) movements, such as modified roll and/or helical motion, but EP 0 784 525 also states why, at least in the view put forward there, the possibilities for surface geometry optimization during the use of a basic machine are nevertheless inadequate.

However, in the meantime, gearwheel production machines have also been developed, which reduce the number of machine axes, as compared with a basic machine, to the necessary extent, so that a tool can be oriented in terms of a workpiece in such a way that a gearwheel can be produced. These machines have linear and pivot axes and axes of rotaion instead of the basic machine axes necessary for the basic machine settings, in order to ensure the necessary degrees of positioning freedom for gearwheel production, and are also referred to as free-form machines (cf., in this respect, likewise the statements in EP 0 784 525, and also U.S. Pat. No. 4,981, 402). Conventionally, such free-form machines have up to six machine axes, specifically, preferably, three linear axes and three axes of rotation, thus constituting a marked simplification in mechanical terms, as compared with a non-free-form machine based on the model of a basic machine.

However, free-form machines of this type not only have a significantly simpler construction than non-free-form machines in mechanical terms, but, furthermore, also afford a further fundamental advantage: with regard to the degrees of freedom made possible in this case, the machining of the workpiece is no longer tied to the, now historic, rigid theoretical significance of the basic-machine axes for the gearwheel, but, instead, is, in principle, completely free and thus also makes it possible, as compared with the basic machines, to generate more sophisticated gearwheel surface geometries, by means of which, for example, the requirements as regards the gearwheel running properties and gearwheel stress, which were mentioned in the introduction and have risen markedly in comparison with earlier times, can fundamentally be achieved.

For the free-form machines, too, there is in this case a theoretical model, to be precise a free-form basic machine with at most six axes, which has a gearwheel to be machined and a tool which can in each case be rotated about an axis, and the tool and the gearwheel to be machined are moveable, preferably displaceable or rotatable, with respect to one another along or about a plurality of axes.

As regards terminology, the foregoing is to be taken as a summary and, for what follows, it is also to be stated, in advance, that, here, this publication in each case designates basic machine: as a model of non-free-form machines, in relation to which all conceivable real non-free-form machines can be uniquely mapped in a reversible way, even to symmetries, and in which each machine axis has a significance in toothing theory, non-free-form machine: as a real machine of an older type of construction, in which a selection of what are known as basic machine settings of the basic machine is available, which in each case have a theoretical significance for the gearwheel to be produced, but in which all the machine axes of the basic machine do not necessarily even actually have to be present in real terms, free-form basic machine: as a model of free-form machines with at most six axes, which has a gearwheel to be machined and a tool which are in each case rotatable about an axis, and the tool and the gearwheel to be machined are moveable, preferably displaceable or rotatable, with respect to one another along or about a plurality of axes and can be uniquely mapped in relation to the free-form machines in a reversible way, even to symmetries, and free-form machine: as a real machine which has linear and pivot axes and axes of rotation instead of the axes of the basic machine which are necessary for the basic machine settings, in order to ensure the necessary degrees of positioning freedom for gearwheel production (these having conventionally, but not necessarily, up to six machine axes, specifically, preferably three linear axes and three axes of rotation).

In particular, in this connection, it is to be pointed out that the term "basic machine" is used only in the above sense and not, for example, as a generic term (in particular, not even as a generic term for free-form basic machines). Furthermore, here and further on, mapping between machines is understood as meaning the mapping of all possible movements of one machine in relation to movements of the others, that is to say not just the mapping of an actual implementation of a production method.

Thus, for example, the prior art according to Krenzer (Krenzer, T., "Knee Verzahnungsgeometrie für Kegelräder durch Schleifen mit kegeligen Topfscheiben ['Flared Cup' Verfahren]" ["New Toothing Geometry for Bevel Wheels by Grinding with Conical Cup Wheels ['Flared-Cup' method]"] in: Theodore J. Krenzer: CNC Bevel Gear Generators and Flared Cup Formate Gear Grinding. The Gleason Works, Rochester, N.Y., 1991) fundamentally discloses the influence which a suitable control of the axes of such a free-form machine can exert, for example, on the contact-pattern improvement of a gearwheel (a property essentially determining the running properties of a gearwheel). However, this flared-cup method is a straightforward forming method in which use is made of the fact that the special tool touches the workpiece wheel in only one line in the profile height direction. This made it possible as it were to "test" the simple monocausal relations, given here, of the forming process in terms of the effect of the respective variation in the control of only a single axis in each case.

The prior art also makes use of this fundamental finding in that it attempts to use these additional degrees of freedom for correcting the surface geometry of bevel or hypoid gears, for example by means of the method for production of tooth-flank modifications according to EP 0 784 525.

A way of tooth-flank modification of the gears in question here is proposed in EP 0 784 525. In more general terms, this presents a method for modifying the surface geometry of such gears, in which, first, the basic machine settings to be originally selected only fixedly for the entire production process in terms of their value are replaced by basic machine setting functions, whereby the value of the basic machine setting can vary during the process of producing the gearwheel, as a result of which, according to the statements of this publication, it is to be possible to modify in a targeted manner the tooth flank and consequently the surface geometry of the gearwheel. This is to take place such that the functional variations described above are converted on the theoretical basic machine there, by means of a method known, for example, from U.S. Pat. No. 4,981,402, to a free-form machine which then carries out the actual gearwheel generation.

According to the statements in EP 0 784 525, therefore, this procedure affords the possibility of conducting gearwheel design calculations and considerations of theoretical significance for the gearwheel, which are based on the theoretical basic machine model, but at the same time, likewise according to the presentation there, also of providing additional freedoms in gearwheel development, in that all the basic machine axes, which could previously be set only fixedly (statically), are used as functionally variable (active) settings during the process of producing the gearwheel, the intention of this being to allow the abovementioned model of the basic machine and its transformation to a free-form machine.

The additional possibilities, fundamentally afforded according to the already mentioned article by Krenzer (see above), and in any case relating only to the special "Flared-Cup method", of the free-form machine for optimizing the surface geometry of a bevel or hypoid gearwheel are thus, according to EP 0 784 525, to be utilized by way of a theoretical basic machine with basic machine settings functionally variable during the production process and by way of its subsequent transformation to the free-form machine.

This procedure has the disadvantage, however, that it uses a multiplicity of redundant control parameters for optimization in the form of the coefficients of the functions mapping the axial movements, since the theoretical basic machine always has more axes than the free-form machine. The result of this is that, because of these parameters, optimization is unnecessarily difficult as a result of these redundancies. Thus, for example when numerical optimization methods employing Jacobi matrices are used, in the case of such redundant parameters there are regularly linear dependences, leading to singular Jacobi matrices, thus resulting in an optimization task which is substantially more difficult to master in numerical terms (cf., also, Nocedal, J. and Wright, S. J., "*Numerical Optimization*", Springer Series in Operations Research, New York, 1999) than if it were based on regular Jacobi matrices, such as occur when non-redundant parameters are used.

This procedure therefore has room for improvement in view of the significance of the optimization method for gears which require the said optimization of their surface geometry, for example in terms of the currently markedly increased requirements, already mentioned in the introduction, with regard to the running properties; this is also particularly because the original theoretical significances of the machine axes no longer have such importance with regard to this optimization of the surface geometry and may therefore be dispensed with in favour of an improvement in optimization.

For such an improvement, however, a method would be required which makes it possible to carry out optimizations of the surface geometry of bevel or hypoid gears directly on the free-form machine, that is to say, in particular, without going by way of the model of the basic machine, in order thereby to avoid the abovementioned disadvantages. Such a method has not hitherto been known according to the prior art.

On the contrary, the methods employed hitherto according to the prior art are all based on the basic machine with its basic machine settings which in each case have a theoretical significance for the gearwheel to be produced:

Thus, for example, findings in toothing theory, with investigations by simulation of, for example, the influence of the parameters on the flank form or the ease-off (cf., also, Wiener, D., "*Örtliche 3D-Flankenkorrekturen zur Optimierung spiralverzahnter Kegelräder*" ["*Local 3D Flank Corrections for the Optimization of Helically Toothed Bevel Wheels*"] in: Seminar Documentation "*Innovationen rund ums Kegelrad*" ["*Innovations around the Bevel Wheel*"], WZL, RWTH Aachen 2001, but also Stadtfelt, H. J., "*The Universal Motion Concept for Bevel Gear Production*", in: Proceedings of the $4^{th}$ World Congress on Gearing and Power Transmission, Volume 1, Paris 1999, pp. 595-697) or, for example, the influence on load contact properties (cf., also, Simon, V., "*Optimal Machine Tool Setting for Hypoid Gears Improving Load Distribution*", ASME Journal of Mechanical Design 123, December 2001, pp. 577-582) are combined, in order to derive suitable algorithms for the configuration of the gearwheel surface geometry.

Also, according to the prior art (cf., for example, Gosselin, C.; Guertin, T.; Remond, D. and Jean, Y., "Simulation and Experimental Measurement of the Transmission Error of Real Hypoid Gears Under Load", ASME Journal of Mechanical Design Vol. 122, March 2000, or Gosselin, C.; Masseth, J. and Noga, S., "*Stock Distribution Optimization in Fixed Setting Hypoid Pinions*", Gear Technology July/August 2001), a Newton-Raphson method is employed in order to carry out flank corrections or special flank adaptations, hence gearwheel geometry modifications or optimizations. However, in this sensitivity-based optimization, only the fixed basic machine settings are varied, in order to achieve flank-form modifications at most of $2^{nd}$ order.

Probably the latest development in the field of the application of modern optimization techniques for gearwheel optimization is the publication "*Automatisches Differenzieren im Maschinenbau-Simulation und Optimierung bogenverzahnter Kegelradgetriebe*" ["*Automatic Differentiation in Mechanical Engineering-Simulation and Optimization of Spirally Toothed Bevel Wheel Transmissions*"] by O. Vogel et al. (Vogel, O., Griewank, A., Henlich, T. and Schlecht, T., "*Automatisches Differenzieren im Maschinenbau-Simulation und Optimierung bogenverzahnter Kegelradgetriebe*" [*Automatic Differentiation in Mechanical Engineering-Simulation and Optimization of Spirally Toothed Bevel Wheel Transmissions*"], in: Conference Volume "*Dresdner Maschinenelemente Kolloquium-DMK2003*" ["*Dresdner Machine Element Conference-DMK2003*"], TU Dresden 2003, pp. 177-194).

As already mentioned, however, all the aforesaid methods always relate to the control of the basic machine with its basic machine settings and their respective significances in toothing theory. This is to be explained against the historic technical background of the procedure of the engineers designing gears who in this case aim at exactly these variables with gearwheel-theoretical significance. Such a procedure is also perfectly useful for the basic design of gears, that is to say those gears which have no modifications in their geometry, as compared with the basic forms thereby achievable, since in this case, on the one hand, the theoretical relation originating from the imagination of a person skilled in the art continues to exist, and, on the other hand, the abovementioned disadvantages do not occur.

For the use of the numerical optimization methods, however, contrary to the opinion according to the prior art (cf., inter alia, EP 0 784 525 B1, there, for example, paragraph number [0016] and [0023]), this toothing-theoretical significance is ultimately completely irrelevant; this is if only because, simply due to the multiplicity of parameters, a person skilled in the art can no longer conclude, from the result of any optimization taking place on a free-form basic machine, what is actually taking place in the production process as a result of these parameters. A toothing-theoretical reference of the machine model used is therefore inconsequential if only for this reason.

SUMMARY OF THE INVENTION

The object of the present invention is, therefore, to specify a method and a apparatus for its implementation, which make it possible to carry out optimizations of the surface geometry of bevel or hypoid gears directly on the free-form basic machine, that is to say, in particular, without going by way of the model of the basic machine, which optimizations can then be mapped directly to a real free-form machine for the purpose of the production or correction of bevel or hypoid gears.

This object is achieved, according to the invention, by means of a method for the optimization of the surface geometry or of a variable, dependent on this, or variables, dependent on this, of bevel or hypoid gears for their production on a free-form machine which can be mapped to a free-form basic machine with at most six axes uniquely in a reversible way, even to symmetries, preferably bijectively, even to symmetries, which has a gearwheel to be machined and a tool which are in each case rotatable about an axis, and the tool and the gearwheel to be machined are moveable, preferably displaceable or rotatable, with respect to one another along or about a plurality of axes, the optimization of the surface geometry or of the variable or variables, dependent on this, of the bevel or hypoid gearwheel taking place in that one or more control parameters, which has or have influence on the surface geometry or the variable or variables, dependent on this, of the bevel or hypoid gearwheel, is or are varied by means of a simulation of the gearwheel production process and/or a roll and/or a load-contact analysis on the free-form basic machine, until the surface geometry or the variable or variables, dependent on this, of the bevel or hypoid gearwheel thereby corresponds at least to a predetermined target value.

In this context, the statement that the free-form machine can be mapped uniquely to a free-form basic machine with at most six axes in a reversible way means that the mapping of the free-form basic machine to the free-form machine is unique.

Furthermore, this object is achieved by means of a computer system for the optimization of the surface geometry of bevel or hypoid gears, having at least one data processing unit and at least one memory, which computer system is characterized, according to the invention, in that the data processing unit is set up, in program terms, such that it operates by the method according to the present invention.

The present invention thus also overcomes the previous incorrect notion that surface geometry optimization, in particular a tooth-flank geometry modification of the gears in question here can be mastered only by means of a method which operates on the basic machine and not on the free-form basic machine, since it requires the toothing-theoretical significance of the individual machine axes.

In a particularly preferred embodiment according to the present invention, where the free-form machine can be mapped onto a free-form basic machine with at most six axes one-to-one, even to symmetries, and the free-form machine and free-form basic machine correspond to one another in axis type and axis arrangement, there is, moreover, the advantage that direct fault-cause analysis can be carried out for the free-form machine on the basis of the free-form basic machine. Thus, for example, the influence of typical axial errors, such as, for example, oscillations, on the gearwheel geometry can be investigated by simulation, in that errors of this type are taken into account in the functional modelling of the axial movements. Furthermore, even with the aid of the optimization carried out according to the present invention of deviations in the generated flank geometry which are due to machine faults can be attributed to the axial movements causing these deviations. In other words, deviations in the tooth geometry which occur due to typical axial errors can be assigned uniquely to the machine axes causing them, thus affording considerable advantages from points of view of production, for example in terms of quality assurance.

The use of the (conventional) basic machine for purposes of simulation and optimization does not allow such a procedure, since, firstly, typical axial errors of the free-form machine cannot be assigned uniquely to the axes of the basic machine on account of the redundancies and, secondly, because of the deviation in axis type and axis arrangement, the possible error of an axis of the free-form machine has to be represented by complex movements of a plurality of axes of the basic machine which would have to be modelled in a correspondingly complicated way. Moreover, a fault cause thus determined, where appropriate, in the model of the basic machine would also have to be transformed to the model of the free-form machine.

It is also to be emphasized that the optimization carried out here according to the present invention can serve both for the first optimized manufacture of gears and for the subsequent correction of already manufactured gears. Particularly in the last instance, it does not matter, in this case, whether the first manufacture took place without optimization, by means of the optimization according to the present invention or else by means of another optimization.

Preferably, the method according to the invention for the optimization of the surface geometry or a variable, dependent on this, or variables, dependent on this, of bevel or hypoid gears is designed such that the optimization of the control parameter or of the control parameters takes place for a free-form basic machine with six axes, preferably three axes of rotation (A, B, C) and three linear axes (X, Y, Z), these preferably being:

the A-axis for tool rotation,
the B-axis for the rotation of the gearwheel to be produced,
the C-axis as an axis of rotation for setting the angle between the A-axis and B-axis or between the B-axis and tool-tip plane,
the X-axis as a linear axis in the A-axis direction,
the Y-axis as a linear axis which forms a right system with the X-axis and Z-axis, and
the Z-axis as a linear axis in the direction of the common perpendicular of the A-axis and B-axis.

A (theoretical) free-form basic machine with six axes makes all six degrees of freedom of movement available for the free-form optimization, so that the freedoms of modern free-form machines can be utilized. It consequently makes available a model which allows all conceivable degrees of freedom for positioning the workpiece and tool with respect to one another, but at the same time presupposes, for this purpose, as few machine axes as possible. The above-described in each case three linear axes and three axes of rotation have proved particularly implementable in practice.

In this case, to explain their fundamental interaction, the axial movements preferably behave, for example, as follows:

The tool (A-axis) rotates independently at the angle of rotation a. The movement of all the other axes is coupled to the abstract command variable t. This command variable t passes through an interval $[t_1, t_2]$ with $t_1 \leq t_2$. Where continuously dividing methods are concerned, the workpiece wheel rotation (B-axis), that is to say the rotation of the gearwheel to be produced, is likewise dependent on the tool angle of rotation a although the modelling of this part-movement $b_T(a)$ will not be considered in any more detail here.

In this case, for further illustration, the functional dependences of the individual axes are, for example, explicitly as follows:

A-axis: a     X-axis: x(t)
B-axis: $\bar{b}(t,a)=b(t)+b_T(a)$   Y-axis: y(t)
C-axis: c(t)   Z-axis: z(t)

The illustration of the dependence of t and a has been based here on the currently existing methods for bevel wheel production. For rolling methods, the command variable t is a further independent variable. In order to represent forming methods in the model, t may be interpreted as a variable dependent on a, for example t(a)=a.

It is also conceivable, in principle, to couple not only the movement of the B-axis, but also the movement of further axes to the A-axis. In practice, however, this seems somewhat problematic, since relatively high-frequency periodic oscillations would then have to be superposed on the present axes.

However, particularly with regard to the axial movements to be influenced by means of machine control parameters, it must be borne in mind, in principle, that, in the method according to the invention for optimization of the surface geometry of bevel or hypoid gears, not only machine control parameters, but also tool setting parameters may serve as control parameters. In this case, a pressure angle which is provided permanently on or in the tool and is generated, for example, during knife grinding may also be such a tool setting parameter, specifically in the same way as those parameters which can be varied during the setting of the knife head.

However, a particularly preferred embodiment of the method according to the present invention relates to one in which at least one machine control parameter for the control of at least one machine axis also at least serves as a control parameter, and in this case it must be remembered, with regard to the control, that here, within the framework of optimization, first the axis of the free-form basic machine, that is to say of a simulation model, serving for simulation is controlled.

In principle, the functional dependence of the movement of an axis on the command variable t may be described by any desired continuous (as a rule, continuously differentiable) function. In this case, in particular, the constant function is also permissible in order to describe a "fixed" axis. As will also be seen later, functions defined piecewise (in segments or at intervals) may also be considered here, for example in the use of splines.

In view of the optimization aimed at here, however, such a function must be provided with parameters which can be employed in order to configure the functional relation. Consequently, $v_j(t)$ (as a function of t) will represent in each case one of the functions b(t), c(t), x(t), y(t), z(t) which relate to the axes B, C, X, Y and Z (see above) dependent on t. The v-axis is accordingly spoken of.

The movement of an axis is therefore ultimately defined by the values of the parameters of the function assigned to it and dependent on t. In order to express the dependence on these parameters, for example for the v-axis, the function $v_j(t,P_j)$ is written instead of $v_j(t)$, $P_j$ being the vector of the parameters of the function of the axis j.

Preferably, therefore, optimization takes place by a variation of the control parameter or control parameters for such a free-form basic machine, the axial movements of which are synchronized with one another by means of at least one, preferably continuous, particularly preferably continuously differentiable mathematical function for axis control $v_j(t,P_j)$, preferably for the control of the machine axis number j, one of the machine axes itself or a virtual axis in this case generating a command variable t and thus serving as a master axis at least for the positioning of the other axes which are functionally dependent on this command variable t and on the parameters contained in a parameter vector $P_j$ assigned to the respective function, and at least also a parameter $P_{j_i}$ from the parameter vector $P_j$ of at least one of the mathematical functions $v_j$ which synchronize the axial movements being used as a control parameter.

A virtual axis is understood in this context to mean a master axis for other axes which is to synchronize these other axes, but does not itself correspond to any mechanical axis in the model of the free-form basic machine and also does not serve for the direct control of one or more mechanical axes in this model.

The synchronization of the axial movements may also take place by means of a plurality of mathematical functions in differing segments, the segments being given by intervals of t, for example as $[t_m, t_n]$ with $t_n > t_m$.

A particularly preferred embodiment of the method for the optimization of the surface geometry or of variables, dependent on this, of bevel or hypoid gears according to the present invention is in this case characterized in that the synchronization of the axial movements takes place by means of additively superposed mathematical functions, the superposition being particularly preferably of the form $$v_j(t,P_j) = v_j^1(t,P_j^1) + v_j^2(t,P_j^2) + \ldots + v_j^l(t,P_j^l)$$

with $l \geq 1$. This is a hybrid model consisting of additively superposed submodels, where the formulation used for the movements of the individual axes within a submodel is in each case to be the same.

With the aid of a hybrid model configuration of this type, in the free-form optimization according to the present invention, there can be a jump to a "tailored" submodel, depending on the aim of the optimization strategy. If appropriate, according to this, submodels may gradually be added, starting from a start model. Thus, for example, a polynomial formulation may be mixed with a spline formulation (cf., in this respect, also Müller, H., Wiener, D. and Dutschk, R., "*A Modular Approach Computing Spiral Bevel Gears and Curvic Couplings*", in: Proceedings of the 4th World Congress on Gearing and Power Transmission, Volume 1, Paris 1999, pp. 531-540), this document also being included in the disclosure content of the publication here by reference.

Preferably, at least, a polynomial of any desired, preferably sixth order may be used as a mathematical function $v_j$ for axial-movement synchronization, the respective coefficients $p_{j_i}$ of the polynomial $v_j$ serving as control parameters.

This is probably the most customary formulation, such as is typically employed also in conventional machine models with additional movements according to the prior art.

It is in principle highly suitable for achieving overall optimization effects in the surface geometry of the gearwheel, such as the modification of flank angle, spiral angle or else the longditudinal curvature.

In a further preferred embodiment of the method for the optimization of the surface geometry or of a variable, dependent on this, or variables, dependent on this, of bevel or hypoid gears according to the present invention, at least also a series expansion based on Chebyshev polynomials as basic functions is used as a mathematical function $v_j$ for axial-movement synchronization, preferably in an interval $[t_1, t_2]$ with $t_1 > t_2$ as a function of the form $$v_j(t,P_j) = p_{j_0} + p_{j_1}T_1(\tilde{t}) + p_{j_2}T_2(\tilde{t}) + \ldots + p_{j_i}T_i(\tilde{t}) + \ldots + p_{j_{d_v}}T_{d_v}(\tilde{t})$$

with $P_i = (p_{i_0}, p_{i_1}, p_{i_2}, \ldots p_{i_j}, \ldots, p_{i_{d_v}})$ and $i = 1, \ldots, d_v$, and also $$\tilde{t} = 2\frac{t - t_1}{t_2 - t_1} - 1,$$

$T_i$ in each case representing a Chebyshev polynomial and the respective coefficients $p_{j_i}$ of the series $v_j$ being used as control parameters.

Chebyshev polynomials are highly suitable, for example, for making it possible to carry out transformations with sufficient accuracy from a basic machine model into an illustration of the free-form machine, preferably of the 6-axis machine, released from the basic machine settings of the said basic machine model together with its respective theoretical significance for gearwheel geometry, this being useful for the case of a basic design of a gearwheel, the surface geometry of which is also to be optimized accordingly.

Moreover, in terms of good numerical solvability of the optimization problems, the Chebyshev polynomials are to be preferred as basic functions, as compared with the monomial basis in the (Taylor) polynomials normally used. The use of the monomial basis leads, with a rising order, to virtually singular and poorly conditioned Jacobi matrices which are detrimental to numerical solvability. This effect is avoided by the orthogonality of the Chebyshev polynomials.

Furthermore, at least, for example, also a spline function, which is formed from polynomials, preferably of the third degree, merging continuously one into the other, may be used as a mathematical function $v_j$ for axial-movement synchronization, and the respective spline coefficients may be used as control parameters (cf., in this respect, also Bronstein, I. N., Semendjajew, K. A., Musiol, G. and Mühlig, G., "*Taschenbuch der Mathematik*" ["*Manual of Mathematics*"], 5th Edition, Frankfurt am Main 2001, pp. 955-960; and also Golub, G. and Ortega, J. M.; "*Scientific Computing—Eine Einführung in das wissenschaftliche Rechnen und Parallele Numerik*" ["*Scientific Computing—An Introduction to Scientific Computation and Parallel Numerics*"], Stuttgart, 1996), these documents also being included in the disclosure content of the publication here by reference.

The use of such splines, preferably cubic splines, is particularly suitable for achieving local optimization effects in the surface geometry of the gearwheel.

It may also be pointed out, at this juncture, that, for the purposes of fault-cause analysis, the axial movements may be supplemented by special submodels (cf. above regarding the additive superposition of various functions $v_j^k$ to form an axial function $v_j$). Thus, for example, a truncated trigonometric series (Fourier series) may also be used as a function $v_j^k$ for axial-movement synchronization, the Fourier coefficients, but also the period, serving as control parameters.

A further embodiment of the method according to the invention is distinguished in that the optimization of the surface geometry or of a variable, dependent on this, or variables, dependent on this, of the bevel or hypoid gearwheel takes place in that the control parameter or control parameters, which has or have influence on the surface geometry or the variable or variables, dependent on this, of the bevel or hypoid gearwheel, is or are varied by means of a numerical optimization method, until the surface geometry or the variable, dependent on this, of the bevel or hypoid gearwheel thereby corresponds to at least one predetermined target value.

In principle, as regards the numerical optimization method, the following may first be noted: each optimization problem can be put, for example, into the following form:

A target function which it is intended to minimize: $f(p) \rightarrow \min!$, the following at the same time applying:
$G(p) \leq 0$ (inequality constraints)
and $H(p) = 0$ (equality constraints)
and also $l \leq p \leq u$ (lower and upper bounds)

p are in this case the parameters.

Details particularly of the numerical optimization methods addressed here are found in J. Nocedal and S. J. Wright (cf. also Nocedal, J. and Wright, S. J., "*Numerical Optimization*", Springer Series in Operations Research, New York, 1999, this document also being included in the disclosure content of the publication here by reference). In the present case, there are generally problems of non-linear optimization with constraints; appropriate methods must therefore also be adopted, for example an SQP method.

The numerical optimization can preferably take place, in detail, as follows:

The design variables to be optimized, that is to say the surface geometry or variable or variables, dependent on this, of the respective bevel or hypoid gearwheel can be determined by simulation calculations on the basis of, for example, a 6-axis model, as also stated later.

In this case, there is a direct functional dependence between the model parameters (see also FIG. 6 of this publication here, from which it may be gathered which variables depend on which) and the design variables, that is to say the variables to be optimized. This dependence is defined/given directly by the simulation method (preferably, in the present case, as a computer program) and can be calculated quantitatively in the form of sensitivities. These can be determined by means of divided differences as a simple, but not the best means, or by automatic differentiation (AD), as explained in more detail below.

The sensitivities describe what influence each individual parameter has on each of the target variables in the linearized model. In mathematical terms, these are the derivatives of the output variables (design variables) of the simulation calculation with respect to the input variables (parameters). These are necessary for target optimization by use of modern numerical methods.

In order to carry out expedient optimization according to the present invention, the objective should be expressed mathematically in the form of an (as a rule) non-linear optimization problem. For this purpose, first, all the design variables involved (variables to be optimized) must be expressed mathematically, that is to say, for example, curves and surfaces must be suitably parameterized or, for example, contact patterns must be expressed quantitatively in suitable form. Second, for the design variables considered at the same time, preferably target variables in the form of target functions with constraints must be defined. The constraints may in this case be formulated as equality constraints and inequality constraints.

An example may illustrate this: an optimization of the flank form of the tooth flanks is to take place, with the tooth thickness being maintained. In this case, the deviation of the flank form from a desired flank form may be quantified by the sum of the squares of the deviations on a grid. This variable is then minimized as a target function, the constant tooth thickness, for example, being considered as an equation secondary condition which may be integrated, for example, as a penalty term into the target function.

The shaping of the ease-off may likewise also be used as an optimization aim, taking into account an upper bound for the maximum rolling error (transmission error). Further suitable optimization aims are presented in the further statements.

Thus, by suitable formulation of expedient optimization problems, the optimization method according to the present invention leads to technically reasonable results, that is to say to gears having a desired configuration in technical terms.

That is to say, first, the target design can, of course, be achieved exactly only if it is not too far away from the initial design, preferably is to be optimized only locally, and if it can actually be implemented at all. Otherwise, by the method according to the invention, at least as good an approximation as possible to the desired aim is nevertheless obtained, whilst, in the case of local optimization methods, it should not be concealed that there is occasionally the risk of achieving an only local optimum here.

Second, it is also expedient that technically senseless solutions must be ruled out by constraints. Thus, for example, it is not sufficient to define a target-flank form and to optimize in respect of this, but at the same time not pay attention to the tooth thickness or tooth depth.

A derivative-based method may in this case be used as a numerical optimization method, in which case, to calculate the derivatives (sensitivities), for example, a difference/quotient method may be employed, which is therefore highly computation-intensive and possibly inaccurate. For this purpose, however, the method of automatic differentiation is preferably adopted, which is substantially more efficient (cf., in this respect, also Griewank (Griewank, A., "*Evaluating Derivatives. Principles and Techniques of Algorithmic Differentiation*", Philadelphia, SIAM, 1999); and Vogel, O., Griewank, A., Henlich, T. and Schlecht, T., "*Automatisches Differenzieren in Maschinenbau-Simulation und Optimierung bogenverzahnter Kegelradgetriebe*" ["*Automatic Differentiation in Mechanical Engineering-Simulation and Optimization of Spirally Toothed Bevel Wheel Transmissions*"], in: Conference Volume "*Dresdner Maschinenelemente Kolloquium-DMK2003*" ["*Dresden Machine Element Colloquium-DMK2003*"], TU Dresden 2003, pp. 177-194; but also Vogel, O., "*Accurate Gear Tooth Contact and Sensitivity Computation for Hypoid Bevel Gears*", in: Corliss, G., Faure, C., Griewank, A., Hascoët, L. and Naumann, U. (publishers), "*Automatic Differentiation of Algorithms—From Simulation to Optimization*", New York 2002, these documents also being included in the disclosure content of the publication here by reference). Use is made, in this case, of the fact that the function to be differentiated consists of elementary arithmetic operations and functions, the derivatives of which are in themselves simple to calculate. The derivative as a whole is then calculated, in parallel with the evaluation of the function itself, during the application of the derivation rules. Thus, a derivative which is accurate, apart from rounding errors, is obtained. c.f. also Preußet al. (Preuβ, W., Wenisch, G., "*Numerische Mathematik*" ["*Numerical Mathematics*"], Munich, Vienna 2001, p. 234).

According to the method for the optimization of the surface geometry or of a variable, dependent on this, or variables, dependent on this, of bevel or hypoid gears according to the present invention, the optimization of the surface geometry takes place at least also

- by means of the form of the tooth flanks, for example also including the gearwheel root, this preferably being carried out such that the method of the least error squares is applied to the deviations from a predetermined geometric desired structure of the tooth-flank geometry, preferably with respect to a 2-dimensional grid, in order to determine whether the form of the tooth flank corresponds to the predetermined target value,
- (note: method of the least error squares is to be understood here and below as meaning that the sum of the respective error squares is to be used as the optimization target value, preferably to be minimized; see, in this respect, also Nocedal and Wright (Nocedal, J., Wright, S. J., "*Numerical Optimization*", Springer Series in Operations Research, New York, 1999), this document also being included in the disclosure content of the publication here by reference),
- by means of the tooth thickness and tooth height,
- by means of the ease-off topography, this preferably being carried out such that the method of the least error squares is applied to the deviations from a predetermined ease-off topography, preferably with respect to a 2-dimensional grid, in order to determine whether the ease-off topography corresponds to the predetermined target value,
- also by means of the rolling error, this preferably being carried out such that the rolling error is monitored with respect to a predetermined maximum value, or else the method of least error squares is applied to the deviations from a predetermined rolling-error function, preferably with respect to a 1-dimensional grid, in order to determine whether the rolling error corresponds to the predetermined target value, also by means of the contact-pattern position, this preferably being carried out such that the method of the least error squares is applied to the deviations of the form and/or of the centre position of the actual contact pattern from a contact pattern predetermined as a contour line in an ease-off topography cleared of the rolling error, preferably with respect to a 1-dimensional grid, in order to determine whether the contact pattern corresponds to the predetermined target value, or else the method of elliptic approximation is used for this purpose, by means of the profile of the contact path by means of the flank clearance and tip clearance, and/or by means of the tensions or pressures dependent on the surface geometry.

Preferably, the specification of the optimization problem also includes the selection of the control parameters (parameters), which may also comprise the selection of preferably one, but also a plurality of submodels (cf., in this respect, the above statements regarding the synchronization of the axial movements by means of additively superposed mathematical functions).

Further optimization possibilities, also in terms of globally oriented optimization strategies, are afforded by the possibility of using what are known as genetic algorithms.

These work, generally, on the basis of a random initial selection of a quantity of control parameters, what is known as a population, the elements of which are subjected in each case to what is known as a fitness test, that is to say a test as to whether a parameter vector of the elements of this quantity leads to a result leading to the optimization aim.

If no search has yet been found, then the quantity is subjected to a probabilistic process of what is known as genetic reproduction and what is known as genetic crossover leading to new parameter vectors which are added to the quantity. Previous elements of the population may in this case even be dispensed with. A new population generation, as it is known, thus occurs, which may be subjected, in turn, to the test, initially mentioned, as to whether, for example, one of its members, that is to say, here, a control-parameter vector, is sufficiently "fit" to solve the set optimization problem. For a more detailed design of these methods known according to the prior art, reference may be made by way of example to John R. Koza, "*Genetic Programming*" (Koza, John A., "*Genetic Programming*", MIT, Cambridge, Mass., USA 1992, regarding the principle of "Genetic Programming", in particular pp. 76f.), this publication also being included in the disclosure content of the publication here by reference.

A preferred embodiment of the method according to the invention for the optimization of the surface geometry or of a variable, dependent on this, or variables, dependent on this, of bevel or hypoid gears is characterized in that the simulation of the production process takes place by means of intersection calculation (cf., in this respect, Beulker, K., "*Berechnung der Kegelradzahngeometrie*" ["*Calculation of Bevel-Wheel Tooth Geometry*"], FVA issue 301, Forschungsgemeinschaft Antriebstechnik e.V., 1997, a publication which is also included in the disclosure content of the publication here by reference), although, alternatively, this may also take place by means of an analytic method based on an enveloping condition, that is to say a toothing law (cf., in this respect, Hutschenreiter U., "*A New Method for Bevel Gear Tooth Flank Computation*", in: Berz, M., Bischof, C., Corliss, G. and Griewank, A. (eds) "*Computational Differentiation-Techniques, Applications, and Tools*", Philadelphia, SIAM 1996, a publication which is likewise included in the disclosure content of the publication here by reference).

The free-form basic machine, preferably with six axes, like any other possible kinematic model, describes a relative movement between tool and workpiece wheel (gearwheel to be machined) as a function of a command variable. This relative movement is described by mathematical maps (formulae) and can therefore be evaluated, that is to say calculated, in the same way as any derivative information required. There is therefore nothing to prevent a simulation of the production process of a bevel or hypoid wheel.

The result is then the exact gearwheel geometry: the generated tooth flanks (including the root) are typically represented in the form of flank grids, that is to say in punctiform manner. By means of the simulation, geometric variables, such as the tooth thickness, tooth height, curvatures, spiral angle and flank angle, etc., can also be determined. The predetermined (or desired) theoretical values of these toothing variables are known. The actual exact values can be determined from the calculated tooth flanks and should then lie as near as possible to the theoretical values.

During the roll simulation/tooth-contact analysis, the input data are typically the exact gearwheel geometry of wheel and pinion, determined in the production simulation, and further parameters (possibly also displacements, etc.) which describe the gearing. The tooth-contact analysis (TCA) results in each case for pull and push pairing in the ease-off (punctiform on a grid), the roll deviation (=rolling error), contact patterns and contact paths on the associated tooth flanks.

Moreover, from the roll simulation, variables, such as flank clearance and tip clearance, can be determined, which may be incorporated, for example, in constrains for optimization.

As illustrated by O. Vogel (cf. Vogel, O., Griewank, A. and Bär, G., "*Direct Gear Tooth Contact Analysis for Hypoid Bevel Gears*", in: Computer Methods in Applied Mechanics and Engineering 191 (2202), pp. 3965-3982, a publication which is also included in the disclosure content of the publication here by reference), the results of the tooth-contact analysis may likewise be characterized analytically, without tooth flanks previously being determined. This affords a particularly suitable way of calculating efficiently the sensitivities required for optimization.

A subsequent load-contact analysis based on the calculated tooth-flank and tooth-root geometry and on the contact properties (mismatch dimensions) delivers the pressures occurring on the tooth flank and the tooth-root tensions. Furthermore, the rolling error under load, the contact temperatures and the efficiency of the toothing can be determined, all these being variables which may be incorporated as limit values or secondary conditions into the optimization.

It is important to emphasize that, irrespective of whatever is calculated, all the variables depend, in particular, on specific parameters of the free-form basic machine, preferably in the 6-axis embodiment. These parameters are therefore to be used for optimization. For this purpose, however, an optimization problem in the abovementioned sense must be specified.

On the basis of the method for the optimization of the surface geometry or of a variable, dependent on this, or variables, dependent on this, of bevel or hypoid gears according to the present invention, it is then also possible, building on this, to specify a method for the production of bevel or hypoid gears with optimized surface geometry, which is characterized in that a basic design of the respective bevel or hypoid gearwheel for a basic machine is carried out, in which each machine axis has a basic machine setting with a theoretical significance for the gearwheel, this preferably taking place by means of the methods known for this purpose according to the prior art (cf. also the standard ANSI-AGMA 2005-C96 or ANSI-AGMA 2005-D05 or the Klingelnberg House Standard KN 3029 No. 3, *"Auslegung von HYPOID-Getrieben mit KLINGELNBERG ZYKLO-PALLOID-VERZAHNUNG" [Design of HYPOID Gears with KLINGELNBERG CYCLO-PALLOID TOOTHING"]*, this document also being included in the disclosure content of the publication here by reference), a transformation of the settings of the basic design for the basic machine to the settings of a free-form basic machine with at most six axes is carried out, the latter having a gearwheel to be machined and a tool which are in each case rotatable about an axis, and the tool and the gearwheel to be machined are moveable, preferably displaceable or rotatable, with respect to one another along or about a plurality of axes, at least one target value for surface geometry or a variable, dependent on this, or variables, dependent on this, of the bevel or hypoid gearwheel are determined, a method for the optimization of the surface geometry or of a variable, dependent on this, or variables, dependent on this, of bevel or hypoid gears according to the present invention is carried out, the control parameter obtained from this or the control parameters obtained are mapped to a free-form machine which can be mapped to the free-form basic machine with at most six axes, preferably bijectively even to symmetries, and the free-form machine is controlled in order, by means of the tool, to remove material from the bevel or hypoid gearwheel to be machined, using the mapped control parameter or the mapped control parameters, so as to obtain the optimized surface geometry.

The method described above is, of course, dependent on whether the transformation of the basic design, which is of course obtained for the basic machine, to the free-form basic machine can be carried out.

Three possibilities of how this may take place are to be indicated here by way of example:

In the case of the use of (Taylor) polynomials for axis synchronization on the free-form machine (see above), a transformation of the settings of the basic machine into settings of the free-form machine can be carried out in an elegant way with the aid of Taylor arithmetics (forward calculation of Taylor series) (cf., in this respect, also Griewank, A., *"Evaluating Derivatives-Principles and Techniques of Algorithmic Differentiation"*, Frontiers in Applied Mathematics, Volume 129, SIAM 2000, this document also being included in the disclosure content of the publication here by reference).

For this purpose, all the (machine) settings of the basic machine are interpreted as variables dependent on the command variable (in this case the roll angle) and are modelled correspondingly in the command variable by means of a Taylor polynomial. This transformation, known, for example, from U.S. Pat. No. 4,981,402, is then not carried out, as proposed there, in punctiform manner with the pure numerical values in conventional arithmetics, but, instead, by Taylor polynomials in Taylor arithmetics. Consequently, instead of the fixed punctiform axis settings, Taylor polynomials, that is to say functions for the axis control, are obtained directly. The result of this transformation is, where appropriate (this depends on the axis configuration and on the production method), only an approximation. More precisely, the movement of the basic machine and that of the free-form machine do not coincide exactly. However, using an order control, the required accuracy over the entire interval $[t_1,t_2]$ can be ensured. The achievement of sufficient accuracy is in this case very easily possible, since typically $|t|<1$ and therefore the influence of the Taylor coefficients diminishes with a rising order. As a result of this procedure, as compared with the merely punctiform transformation according to U.S. Pat. No. 4,981,402, which, of course, is also used in EP 0 784 525, a parameterized functional illustration of the movement of the axes is obtained again. This affords the advantage of the possible further utilization of this representation, for example in connection with optimization.

For an approximate description of functions over an entire interval, Chebyshev approximations are particularly suitable (cf., in this respect, also Bronstein, I. N., Semendjajew, K. A., Musiol, G. and Mühlig, G., *"Taschenbuch der Mathematik" ["Manual of Mathematics"]*, 5th Edition, Frankfurt am Main 2001, pp. 947-948, this document also being included in the disclosure content of the publication here by reference). As compared with the abovementioned model transformations by means of Taylor arithmetics, as regards an only approximately possible transformation, a reduction in the required order is to be expected when a Chebyshev approximation is used. The determination of the Chebyshev approximation may take place by means of known algorithms (Chebyshev approximation or regression), for example on the basis of the punctiform transformation from U.S. Pat. No. 4,981,402 (cf., in this respect, also Judd, K., *"Numerical Methods in Economics"*, MIT Cambridge Mass., 1998, this document also being included in the disclosure content of the publication here by reference).

A further possibility, then, is also to interpret the settings of the basic machine, preferably $p^{K0}=\{P_i,P_j,\Sigma,S,X_b,X_p,E_m,RA,q_m\}$ (that is to say, the settings: tool inclination [preferably cutter-head or grinding-wheel inclination] (tilt), inclination orientation (swivel), machine root angle, tool eccentricity or radial, depth feed, distance of machine centre to axis intersection point, machine axis offset, roll ratio, cradle angle) as the parameters of the assigned submodel of the free-form machine.

Thus, for each axis of the free-form machine, the proportional movement resulting from this submodel can be exactly determined in punctiform manner, for example, with the aid of the punctiform transformation from U.S. Pat. No. 4,981,402. The algorithm carried out in this case describes a functional relation, that is to say may be interpreted abstractly as a function which describes the proportional movement of all the axes of the free-form machine. In this way, therefore, the settings of the basic machine can be integrated into the model of the free-form basic machine, for example in order to enable a person skilled in the art, who knows this better, to have a further possibility for exerting influence after free-form optimization according to the present invention has already been carried out in a submodel preferred for this purpose.

This amalgamation of the basic machine and free-form basic machine in one model, with the possibility of carrying out production simulation, is a further advantage of the present invention, the possibility of which has hitherto been disputed by the experts, for example in EP 0 784 525.

In general, it must be said, regarding the transformation process of the basic design from the basic machine to the free-form machine, that, of course, machine settings for all four flanks of a gearwheel pairing are always determined.

On the basis of the method for the optimization of the surface geometry or variables, dependent on this, of bevel or hypoid gears according to the present invention, it is then also possible, building on this, to specify a method for the correction of bevel or hypoid gears with optimized surface geometry, which is characterized in that, for an already manufactured bevel or hypoid gearwheel, for which one or more control parameters, which has or have influence on the surface geometry or the variable or variables, dependent on this, of the bevel or hypoid gearwheel, has or have already been determined for the free-form basic machine, at least one target value for the surface geometry or a variable, dependent on this, or variables, dependent on this, of the bevel or hypoid gearwheel is predetermined, the method for the optimization of the surface geometry or of a variable, dependent on this, or variables, dependent on this, of bevel or hypoid gears according to the present invention is carried out, and the new control parameter obtained from this or the new control parameters obtained is or are mapped to a free-form machine which can be mapped to a free-form basic machine with at most six axes, preferably bijectively, and the free-form machine is controlled in order, by means of the tool, to remove material from the bevel or hypoid gearwheel to be machined, using the mapped control parameter or mapped control parameters, so as to obtain the optimized surface geometry.

As already mentioned in the introduction, the method according to the invention for the optimization of the surface geometry or of a variable, dependent on this, or variables, dependent on this, of bevel or hypoid gears may also be carried out on a computer system with at least one data processing unit and with at least one memory, normally, for example, as a computer program, the latter having the corresponding instructions which are set up for carrying out the method. Such a computer program may in this case take any form, but, in particular, also be a computer program product on a computer-readable medium, such as, for example, a floppy disc, CD or DVD, at the same time having a computer program code means, in which, in each case after the loading of the computer program, a computer is induced by the program to carry out the method according to the invention. It may, however, also take the form, for example, of a computer program product which has a computer program on an electronic carrier signal, in which, in each case after the loading of the computer program, a computer is induced by the program to carry out the method according to the invention.

From the above-described individual different elements of the present invention, as seen in entirety, a gearwheel production and/or correction system for the production or correction of bevel or hypoid gears for cooperation can also be assembled, specifically with a computer system for the optimization of the surface geometry of bevel or hypoid gears, with at least one data processing unit and with at least one memory, the data processing unit being set up in program terms such that it operates according to a method for the optimization of the surface geometry or variables, dependent on this, of bevel or hypoid gears, and a free-form machine with at most six axes, which has a gearwheel to be machined and a tool which are in each case rotatable about an axis, and the tool and the gearwheel to be machined are moveable, preferably displaceable or rotatable, with respect to one another along or about a plurality of axes, and which is controlled in order, by means of the tool, to remove material from the bevel or hypoid gearwheel to be machined, so as to obtain the optimized surface geometry, specifically using a control parameter mapped onto the free-form machine or control parameters mapped onto the free-form machine, which is or are determined by means of the computer system.

Preferably, the gearwheel production and/or correction system for the production or correction of the bevel or hypoid gears has a computer system with a storage unit (floppy disc drive, CD drive, DVD drive or else a chip-card or USB/memory-stick unit) for writing the control parameter or control parameters on a data carrier, or a transmission unit for transmitting the control parameter or control parameters, and the free-form machine with at most six axes has a read unit for reading the data carrier having the control parameter or control parameters or a reception unit for receiving the control parameter or control parameters. The control parameter or control parameters can thereby travel from the computer system to the 6-axis machine for the control of the latter.

BRIEF DESCRIPTION OF THE DRAWINGS

Exemplary embodiments of the present invention which are not to be understood restrictively are discussed below, with reference to the drawing in which.

DESCRIPTION OF THE PREFERRED EMBODIMENTS

Figure 1:
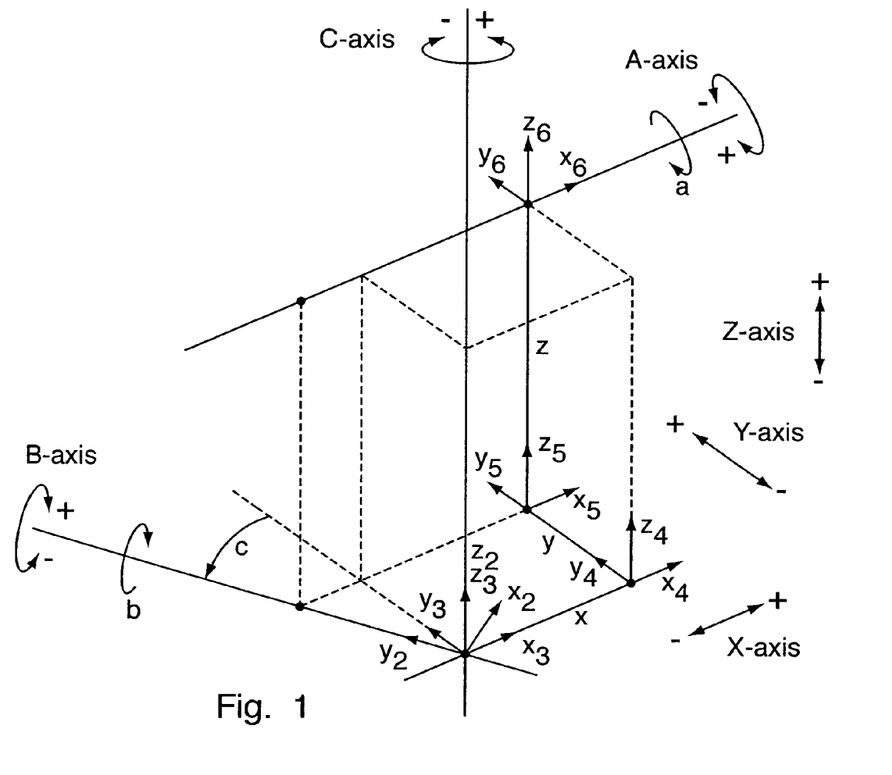
FIG. 1 shows an embodiment of a general 6-axis model of a tooth-cutting machine (free-form basic machine) and the coordinate systems relevant in this case.

FIG. 1 shows an embodiment of a general 6-axis model of a tooth-cutting machine (free-form basic machine) and the coordinate systems relevant in this case. The coordinate systems $\Sigma_1$ to $\Sigma_7$ are used to describe the relative movement of the tool in relation to the workpiece.

The coordinate system $\Sigma_7$ is connected fixedly to the tool. It rotates with respect to $\Sigma_6$ mathematically positively about the common x-axis at the angle of rotation a. The axis of rotation $x_6 = x_7$ points into the tool.

The coordinate system $\Sigma_1$ is connected fixedly to the workpiece. It rotates with respect to $\Sigma_2$ mathematically positively about the common y-axis at the angle of rotation b. The axis of rotation $y_2 = y_1$ points into the workpiece.

The 3 linear axes X, Y and Z form a righthand coordinate system. The relative position of $\Sigma_6$ to $\Sigma_2$ is illustrated here in the figure and is described exactly by the following transformations:

$$r_1 = D_2^T(b) r_2, \quad r_2 = D_2(b) r_1,$$

$$r_2 = D_3^T(c) r_3, \quad r_3 = D_3(c) r_2,$$

$r_3 = r_4 + |x0\ 0|^T,\ r_4 = r_3 - |x0\ 0|^T,$ $r_4 = r_5 + |0y0|^T,\ r_5 = r_4 - |0y0|^T,$ $r_5 = r_6 + |0\ 0z|^T,\ r_6 = r_5 - |0\ 0z|^T,$ $r_6 = D_1(a)r_7,\ r_7 = D_1^T(a)r_6.$

This results, overall, in the transformation $r_1 = Ar_7 + a$ with $A = D_2^T(b)D_3^T(c)D_1(a),$ $a = D_2^T(b)D_3^T(c)[x\ y\ z]^T$ Conversely, the transformation $r_7 = \overline{A}r_1 + \overline{a}$ is obtained, with $\overline{A} = D_1^T(a)D_3(c)D_2(b),$ $\overline{a} = -D_1^T(a)[x\ y\ z]^T$ In this case, the 3×3 matrices $D_1(a)$, $D_2(b)$ and $D_3(c)$ designate rotations in each case about the x-, y- and z-axis of a coordinate system at the angles of rotation a, b and c respectively.

Figure 2:
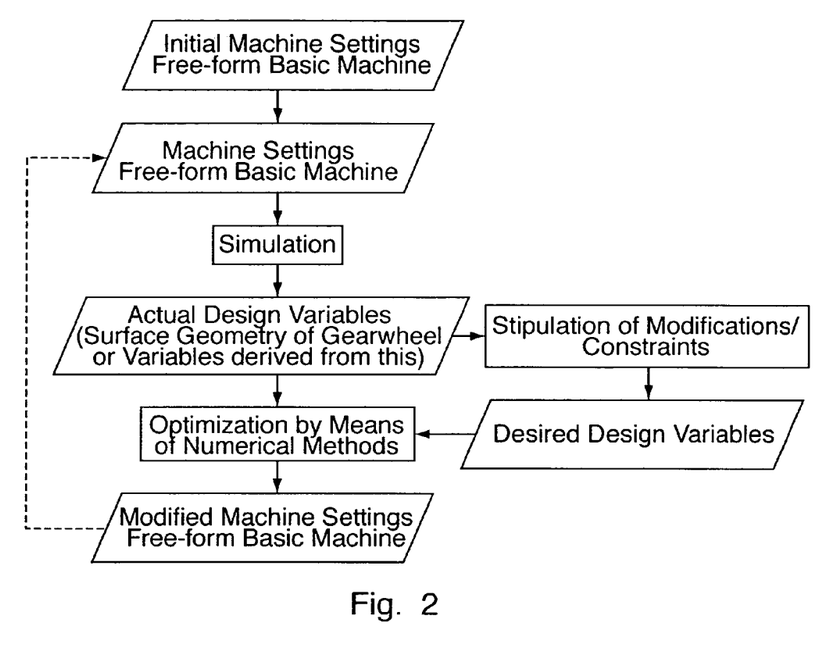
FIG. 2 shows a diagrammatic illustration of a preferred embodiment of the method according to the present invention.

FIG. 2 shows a diagrammatic illustration of a preferred embodiment of the method according to the present invention.

On the basis of given machine settings for the free-form basic machine and the model of the free-form basic machine, a simulation calculation is carried out in order to determine relevant design variables, such as, for example, the flank form and the tooth thickness. This simulation calculation comprises, depending on the design variables to be determined, the production simulation and also contact analysis and load-contact analysis. Such a load-contact analysis is possible, for example, according to the prior art, by means of the program BECAL which is used within the framework of the KIMOS system developed by the company Klingelnberg and which comes from the Forschungsvereinigung Antriebstechnik (FVA).

By modifications for the design variables being stipulated, a desired design is defined, this including the stipulation of secondary conditions to be adhered to. For example, the target which is pursued may be a tooth form modified within a certain scope, with the current tooth thickness being maintained. With the aid numerical methods of, as a rule, non-linear optimization, modified machine settings for the free-form basic machine are determined, which at least approximately implement the desired design. The quality of this approximation depends essentially on the good nature of the formulated target. This process may be repeated as often as required. The relevant machine settings for the first and, if appropriate, only pass are obtained from the design calculation according to FIG. 7 (initial machine settings).

Figure 3:
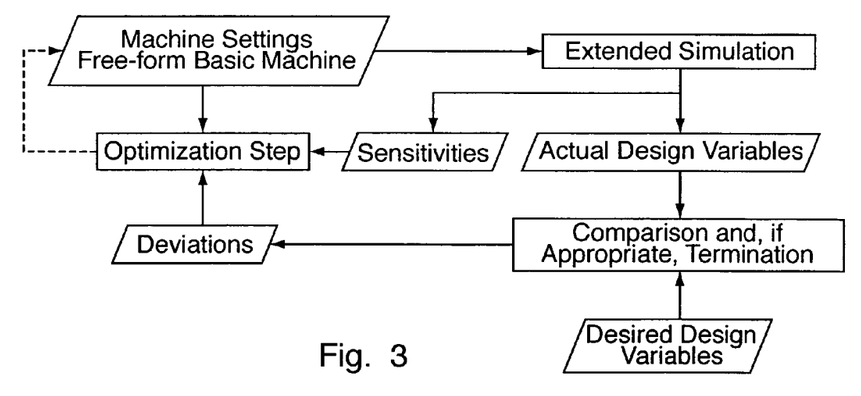
FIG. 3 shows a diagrammatic illustration of a further preferred embodiment of the method according to the present invention.

FIG. 3 shows a diagrammatic illustration of a further preferred embodiment of the method according to the present invention.

What is shown is the typical data flow of iteratively operating derivative-based optimization methods, that is to say a concretization of the step "Optimization by means of Numerical Methods" according to FIG. 2. The current machine settings of the free-form basic machine (note: these are always the settings for all four flanks!) implement an actual design which is quantified by means of simulation calculations. The comparison of the actual design with the desired design leads to deviations. If these deviations are acceptable, the iterative optimization method is successfully discontinued. Otherwise, in what is known as the optimization step, new machine settings are determined from the current machine settings and the deviations determined from these, with the aid of the sensitivities, and then become the current machine settings. To determine the sensitivities (derivatives), the simulation calculation may be extended correspondingly. Further information on this is found in O. Vogel et al. (Vogel, O., Griewank, A., Henlich, T. and Schlecht, B., "Automatisches Differenzieren im Maschinenbau—Simulation und Optimierung bogenverzahnter Kegelradgetriebe" ["Automatic Differentiation Mechanical Engineering—Simulation and Optimization of Spirally Toothed Bevel Wheel Transmissions"] in: Conference Volume "Dresdner Maschinenelemente Kolloquium-DMK2003" ["Dresdner Machine Element Colloquium-DMK2003"], TU Dresden 2003, pp. 177-194), this document also being included in the disclosure content of the publication here by reference.

In order to ensure a termination of the method even in the case of problems which can be solved only poorly or not at all, as a rule, further stopping criteria are used, which will not be referred to here in any more detail. See, in this respect, also Nocedal and Wright (Nocedal, J., Wright, S. J., "Numerical Optimziation", Springer Series in Operations Research, New York, 1999), this document also being included in the disclosure content of the publication here by reference.

Figure 4:
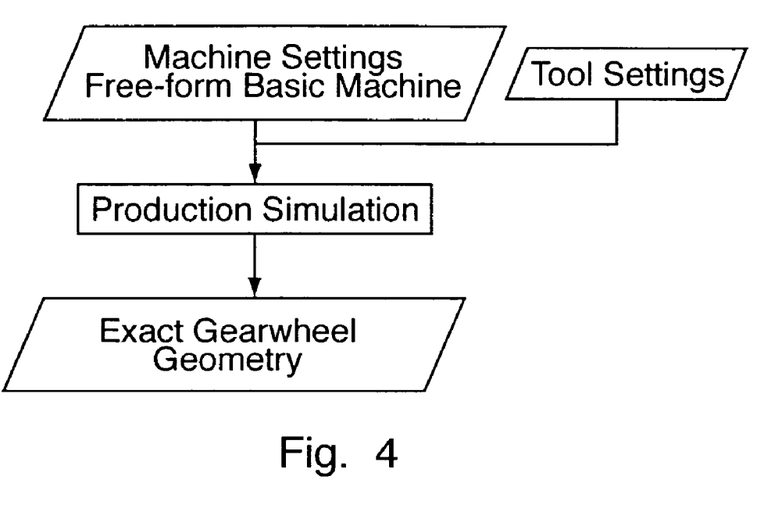
FIG. 4 shows a diagrammatic illustration of part of a preferred embodiment of the method according to the present invention for simulating the production of a bevel or hypoid gearwheel (pinion or ring gear)

FIG. 4 shows a diagrammatic illustration of part of a preferred embodiment of the method according to the present invention for simulating the production of a bevel or hypoid gearwheel (pinion or ring gear).

It illustrates that, on the basis of the machine settings of a free-form basic machine and the tool settings, a production simulation for a gearwheel can be carried out. The result of this production simulation is the exact gearwheel geometry which comprises the tooth flanks (including the tooth root) as a flank grid, and also variables, such as the tooth thickness and tooth height.

Figure 5:
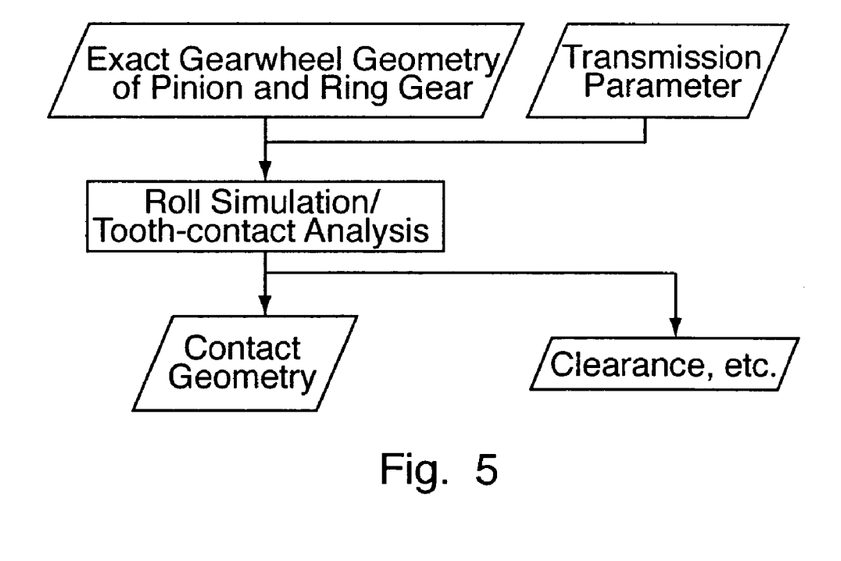
FIG. 5 shows a diagrammatic illustration of a further part of a preferred embodiment of the method according to the present invention for simulating the rolling, hence the tooth-contact analysis.

FIG. 5 shows a diagrammatic illustration of a further part of a preferred embodiment of the method according to the present invention for simulating the rolling, hence the tooth-contact analysis.

It is illustrated that a roll simulation/tooth-contact analysis is carried out by means of the exact gearwheel geometry of pinion and ring gear, obtained by production simulation, and gearing parameters, such as angle between axes and centre distance of axes, but also displacements. In this case, both a single and a multiple meshing of the teeth may be considered. The roll simulation/tooth-contact analysis results not only in the variables, such as ease-off, contact pattern and rolling error, which is described in the contact geometry, but also variables, such as tip and flank clearance. The contact geometry and also the exact gearwheel geometry constitute the relevant variables for the load-contact analysis, not illustrated here.

Furthermore, as regards the optimization target variables, it should be noted: the clearance variables are also not to be seen merely as scalar/punctiform variables. Thus, in the case of the tip clearance, and also as regards the rolling error, either, for example, the minimum tip clearance or the tip clearance along the entire tooth may be considered.

Figure 6:
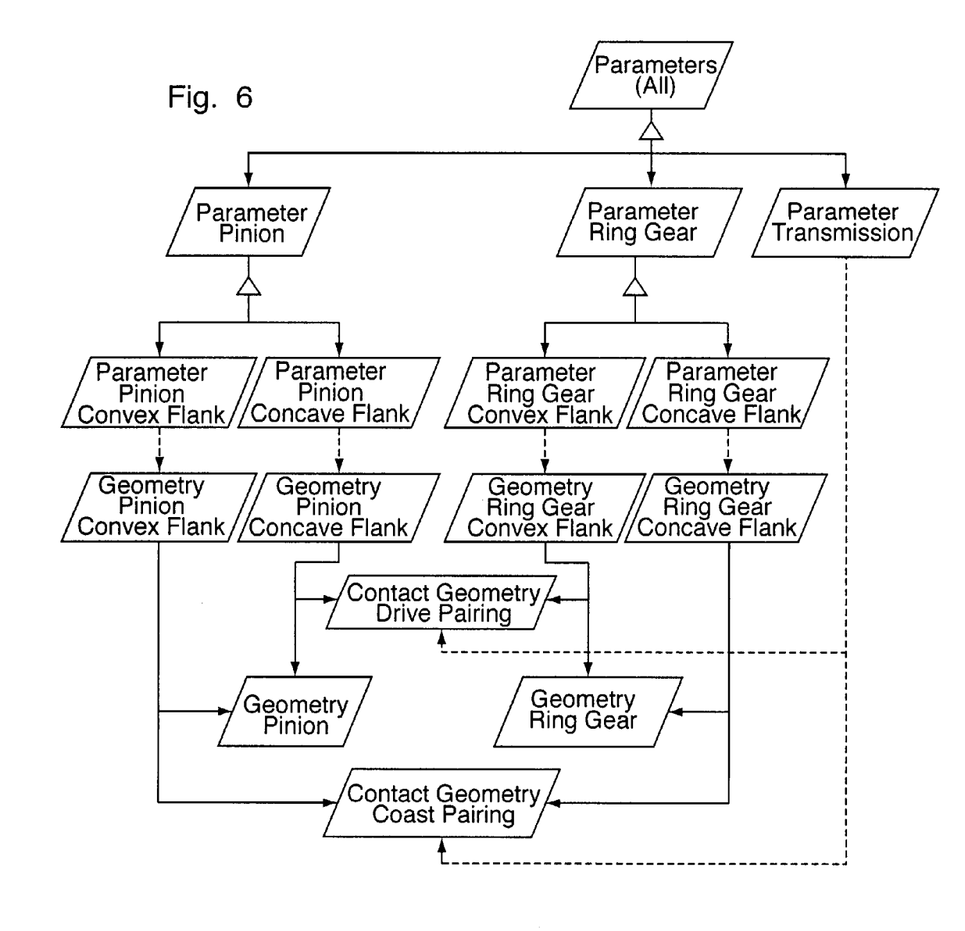
FIG. 6 shows a diagrammatic illustration of the fundamental influence of parameters on the surface geometry of bevel or hypoid gears and of the resulting influence on the contact geometry.

FIG. 6 shows a diagrammatic illustration of the fundamental influence of parameters on the surface geometry of bevel or hypoid gears and of the resulting influence on the contact geometry.

Figure 7:
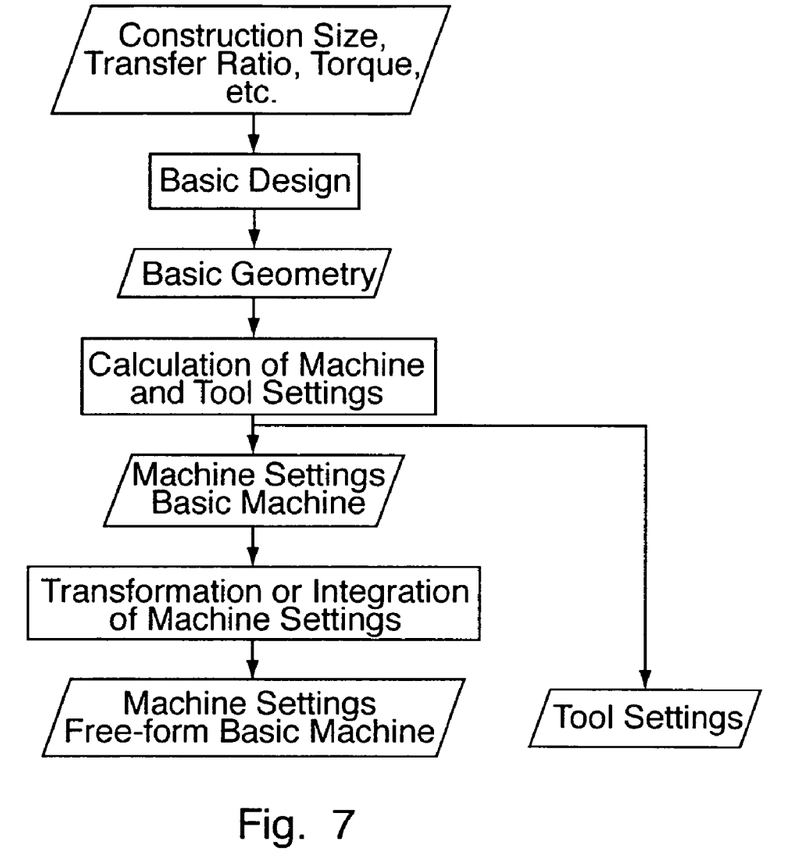
FIG. 7 shows a diagrammatic illustration of part of a preferred embodiment of the method according to the present invention for initial parameter configuration (initial settings).

FIG. 7 shows a diagrammatic illustration of part of a preferred embodiment of the method according to the present invention for initial parameter configuration (initial settings).

In the basic design of bevel and hypoid gearwheel transmissions, the basic geometry of pinion and ring gear is determined, for example, on the basis of construction size, transfer ratio and torque. The subsequent calculation of associated machine and tool settings takes place, here, on the principle of a basic machine, so that, first, machine settings for this basic machine are obtained. These are then transformed into machine settings of the free-form basic machine, but, in the case of a mixed model, are integrated only as settings (parameters) of the corresponding submodel.

What is claimed is:

1. A method for the optimization of the surface geometry, or of a variable or variables dependent on the surface geometry, of a bevel or hypoid gear for production on a free-form machine, the method comprising:

selecting target values corresponding to said variable or variables to be optimized, said variable or variables to be optimized being dependent on the surface geometry of the gear;

modeling the free-form basic machine to identify one or more control parameters, which has or have influence on the surface geometry;

generating an initial setting for each control parameter based on the basic geometry of pinion and wheel or based on a random initial selection;

simulating the gearwheel production process on the free-form basic machine to obtain a simulated gearwheel geometry, said variable or variables to be optimized, and deviations of said variable or variables to be optimized from the target value or target values;

determining a new setting for each control parameter based on the deviations of said variable or variables to be optimized or based on a probabilistic process of genetic reproduction and genetic crossover; and repeating said steps of simulating and determining until the simulated value for each dependent variable thereby corresponds at least approximately to the corresponding target value, wherein said free-form machine can be mapped to a free-form basic machine with at most six axes uniquely in a reversible way, even to symmetries, said free-form basic machine having a gearwheel to be machined and a tool, each of which is rotatable about its own axis, and the tool and the gearwheel to be machined are displaceable or rotatable, with respect to one another along or about a plurality of axes.

2. The method according to claim 1, wherein the free-form machine can be mapped onto a free-form basic machine with at most six axes one-to-one, even to symmetries, and their axis type and axis arrangements correspond to one another.

3. The method according to claim 1, wherein the optimization of the control parameter or of the control parameters takes place for a free-form basic machine with six axes, preferably three axes of rotation (A, B, C) and three linear axes (X, Y, Z).

4. The method according to claim 3, wherein the optimization of the control parameter or control parameters takes place for a free-form basic machine with the six axes
A-axis for tool rotation
B-axis for the rotation of the gearwheel to be produced
C-axis as an axis of rotation for setting the angle between the A-axis and B-axis or between the B-axis and tool-tip plane,
X-axis as a linear axis in the A-axis direction,
Y-axis as a linear axis which forms a right system with the X-axis and Z-axis, and
Z-axis as a linear axis in the direction of the common perpendicular of the A-axis and B-axis.

5. The method according to claim 1, wherein at least also one tool setting parameter serves as a control parameter.

6. The method according to claim 1, wherein at least also one machine control parameter for controlling at least one machine axis serves as a control parameter.

7. The method according to claim 1, wherein the optimization of the control parameter or control parameters takes place for such a free-form basic machine, the axial-movement simulations of which are synchronized with one another by means of at least one, preferably continuous, particularly preferably continuously differentiable mathematical function for axis control $v_j(t,P_j)$, one of the machine axes itself or a virtual axis in this case generating a command variable t and thus serving as a master axis at least for positioning the other axes, which are functionally dependent on this command variable t and on the parameters contained in a parameter vector $P_j$ assigned to the respective function, and at least also a parameter $P_{j_i}$ form the parameter vecter $P_j$ of at least one of the mathematical functions $v_j$ which synchronize the axial movements being used as a control parameter.

8. The method according to claim 7, wherein the synchronization of the axial movements takes place by means of a plurality of mathematical functions in differing segments, the segments being defined by intervals of t, for example as $[t_m,t_n]$ with $t_n>t_m$.

9. The method according to claim 7, wherein the synchronization of the axial movements takes place by means of additively superposed mathematical functions, the superposition being particularly preferably of the form $$v_j(t,P_j) = v_j^1(t,P_j^1) + v_j^2(t,P_j^2) + \ldots + v_j^l(t,P_j^l)$$

with $l \geq 1$.

10. The method according to claim 7, wherein a polynomial of sixth order is used as a mathematical function $v_j$ for axial-movement synchronization, and the respective coefficients $P_{j_i}$ of the polynomial $v_j$ are used as control parameters.

11. The method according to claim 7, wherein a series expansion based on Chebyshev polynomials as basic functions is used as a mathematical function $v_j$ for axial-movement synchronization in an interval $[t_1,t_2]$ with $t_1>t_2$ as a function of the form $$v_j(t, P) = p_{j_0} + p_{j_1} T_1(\tilde{t}) + p_{j_2} T_2(\tilde{t}) + \ldots + p_{j_i} T_i(\tilde{t}) + \ldots + p_{j_{d_v}} T_{d_v}(\tilde{t})$$

with $P_j = (p_{j_0}, p_{j_1}, p_{j_2}, \ldots p_{j_i}, \ldots, p_{j_{d_v}})$ and $i = 1, \ldots, d_v$ and $\tilde{t} = 2 \frac{t - t_1}{t_2 - t_1} - 1$ and also $T_i$ in each case as a Chebyshev polynomial and, in this case, the respective coefficients $P_{j_i}$ of the series $v_j$ are used as control parameters.

12. The method according to claim 7, wherein a spline function, which is formed from polynomials, preferably of the third degree, merging continuously one into the other, is used as a mathematical function $v_j$ for axial-movement synchronization, and the respective spline coefficients are used as control parameters.

13. The method according to claim 1, wherein the step of determining a new setting for each control parameter includes using a numerical optimization method to determine the new setting for each control parameter.

14. The method according to claim 13, wherein a derivative-based method is used as a numerical optimization method.

15. The method according to claim 14, wherein, to calculate the derivatives (sensitivities), a difference/quotient method is used.

16. The method according to claim 15, wherein automatic differentiation (AD) is used to calculate the derivatives (sensitivities).

17. The method according to claim 1, wherein the step of determining a new setting for each control parameter includes using a genetic algorithm to determine the new setting for each control parameter.

18. The method according to claim 1, wherein the form of the tooth flanks, including the gearwheel root, is an optimized variable.

19. The method according to claim 18, wherein the method of least error squares is applied to the deviations from a predetermined geometric desired structure of the tooth-flank geometry, with respect to a 2-dimensional grid, in order to determine whether the form of the tooth flank corresponds to the predetermined target value.

20. The method according to claim 1, Wherein the tooth thickness and tooth height are optimized variables.

21. The method according to claim 1, wherein the ease-off topography is an optimized variable.

22. The method according to claim 21, wherein the method of the least error squares is applied to the deviations from a predetermined ease-off topography, preferably with respect to a 2-dimensional grid, in order to determine whether the ease-off topography corresponds to the predetermined target value.

23. The method according to claim 1, Wherein the rolling error is an optimized variable.

24. The method according to claim 23, wherein the rolling error is monitored in terms of a predetermined maximum value, in order to determine whether the rolling error corresponds to the predetermined target value.

25. The method according to claim 23, wherein the method of the least error squares is applied to the deviations from a predetermined rolling-error function, preferably with respect to a 1-dimensional grid, in order to determine whether the rolling error corresponds to the predetermined target value.

26. The method according to claim 1, wherein the contact-pattern position is an optimized variable.

27. The method according to claim 26, wherein the method of the least error squares is applied to the deviations of the form and/or of the centre-point position of the actual contact pattern from a contact pattern predetermined as a contour line in an ease-off topography cleared of the rolling error, preferably with respect to a 1-dimensional grid, in order to determine whether the contact pattern corresponds to the predetermined target value.

28. The method according to claim 26, wherein the method of elliptic approximation is used in order to determine whether the contact pattern corresponds to the predetermined target value.

29. The method according to claim 1, Wherein the profile of the contact path or contact paths is an optimized variable.

30. The method according to claim 1, wherein the flank clearance and tip clearance are optimized variables.

31. The method according to claim 1, wherein the tensions dependent on the surface geometry are optimized variables.

32. The method according to claim 1, wherein the pressures dependent on the surface geometry are optimized variables.

33. The method according to claim 1, wherein the simulation of the production process takes place by means of intersection calculation.

34. The method according to claim 1, wherein the simulation of the production process takes place by means of an analytic method based on an enveloping condition, that is to say a toothing law.

\* \* \* \* \*